(12) United States Patent
Delshadpour et al.

(10) Patent No.: US 12,483,449 B2
(45) Date of Patent: Nov. 25, 2025

(54) PASSIVE EQUALIZER

(71) Applicant: NXP USA, Inc., Austin, TX (US)

(72) Inventors: Siamak Delshadpour, Phoenix, AZ (US); Alexander Wayne Sheldon, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 18/162,337

(22) Filed: Jan. 31, 2023

(65) Prior Publication Data

US 2024/0259238 A1 Aug. 1, 2024

(51) Int. Cl.
*H04L 25/03* (2006.01)
*H04L 25/02* (2006.01)

(52) U.S. Cl.
CPC .... *H04L 25/03885* (2013.01); *H04L 25/0272* (2013.01); *H04L 25/03031* (2013.01)

(58) Field of Classification Search
CPC ............ H04L 25/0272; H04L 25/0278; H04L 25/03006; H04L 25/03019; H04L 25/03031; H04L 25/03057; H04L 25/03076; H04L 25/03127
USPC ...... 375/229, 232, 233, 348, 350; 333/28 R; 708/322, 323
See application file for complete search history.

(56) References Cited

U.S. PATENT DOCUMENTS

| | | | |
|---|---|---|---|
| 5,450,452 A * | 9/1995 | Kakuishi | H03L 7/0992 331/1 R |
| 7,394,331 B2 * | 7/2008 | Yeung | H04B 3/145 333/28 R |
| 7,634,243 B1 * | 12/2009 | Esquivel | H03J 1/0008 455/314 |
| 9,780,976 B2 * | 10/2017 | Greene | H04L 25/03031 |
| 10,038,574 B2 | 7/2018 | Islam et al. | |
| 10,637,695 B1 | 4/2020 | Venkatesan et al. | |
| 10,924,307 B1 | 2/2021 | Zhang et al. | |
| 11,206,160 B2 | 12/2021 | Delshadpour et al. | |
| 11,206,161 B1 | 12/2021 | Delshadpour et al. | |
| 11,228,470 B2 | 1/2022 | Delshadpour et al. | |
| 11,245,555 B1 | 2/2022 | Delshadpour | |
| 11,296,667 B1 | 4/2022 | Delshadpour | |
| 11,296,737 B1 | 4/2022 | Delshadpour | |
| 11,349,463 B2 | 5/2022 | Delshadpour et al. | |
| 2009/0176467 A1 * | 7/2009 | Im | H03J 3/06 455/182.1 |
| 2012/0043968 A1 * | 2/2012 | Kojima | H04B 3/14 333/28 R |

(Continued)

OTHER PUBLICATIONS

Depaoli, Emanuele et al.; "A 64 GB/s Low-Power Transceiver for Short-Reach PAM-4 Electrical Links in 28-nm FDSOI CMOS"; IEEE Journal of Solid-State Circuits; vol. 54, No. 1; Jan. 2019; pp. 6-17.

(Continued)

*Primary Examiner* — Young T. Tse (57) ABSTRACT

One example discloses s passive equalizer circuit, including: an input configured to receive an input signal having an input frequency band; a transfer function circuit configured to transform the input frequency band into an output frequency band; and an output configured to be coupled to an active equalizer circuit and carry an output signal having the output frequency band; wherein the transfer function circuit includes a variable impedance configured to adjust a midband frequency gain of the output signal.

15 Claims, 7 Drawing Sheets

(56) References Cited

U.S. PATENT DOCUMENTS

| | | | |
|---|---|---|---|
| 2017/0250730 A1* | 8/2017 | Chang | H04B 3/145 |
| 2017/0353205 A1* | 12/2017 | Chakraborty | H04B 1/16 |
| 2020/0185013 A1* | 6/2020 | Chang | G11C 7/225 |
| 2021/0075653 A1* | 3/2021 | Rogers | H04L 25/03127 |
| 2021/0367816 A1* | 11/2021 | Ransijn | H04L 25/03127 |
| 2024/0214028 A1* | 6/2024 | Poulton | H04B 3/04 |

OTHER PUBLICATIONS

Delshadpour, Siamak et al.; "A 5.4 Gbps Protocol Based CMOS Limiting ReDriver for Type-C Applications"; 2019 IEEE 62nd International Midwest Symposium on Circuits and Systems; Aug. 2019; pp. 255-258.

* cited by examiner

PASSIVE EQUALIZER

The present specification relates to systems, methods, apparatuses, devices, articles of manufacture and instructions for equalization.

SUMMARY

According to an example embodiment, a passive equalizer circuit, comprising: an input configured to receive an input signal having an input frequency band; a transfer function circuit configured to transform the input frequency band into an output frequency band; and an output configured to be coupled to an active equalizer circuit and carry an output signal having the output frequency band; wherein the transfer function circuit includes a variable impedance configured to adjust a mid-band frequency gain of the output signal.

In another example embodiment, the passive equalizer includes only passive resistive, capacitive and/or inductive elements.

In another example embodiment, the variable impedance includes a first variable capacitance ($C_4$) in parallel with the active equalizer circuit; and the first variable capacitance adjusts the set of mid-band frequencies of the output frequency band.

In another example embodiment, a value of the first variable capacitance is statically trimmed using a set of one-time-adjustable passive elements.

In another example embodiment, a value of the first variable capacitance is dynamically trimmed using a controller.

In another example embodiment, the first variable capacitance includes a set of switches; and an open and closed state of the set of switches adjusts the first variable capacitance.

In another example embodiment, the first variable capacitance is in parallel with a first resistance ($R_4$) and in series with a second resistance ($R_3$); and the second resistance ($R_3$) is coupled to the output.

In another example embodiment, a pole of the set of mid-band frequencies is equal to $1/(R_4 * C_4)$.

In another example embodiment, the variable impedance includes a second variable capacitance ($C_2$) in series with the active equalizer circuit; and the second variable capacitance adjusts a zero frequency of the output frequency band.

In another example embodiment, the first variable capacitance includes a first set of switches; an open and closed state of the first set of switches adjusts the first variable capacitance; the second variable capacitance includes a second set of switches; and an open and closed state of the second set of switches adjusts the second variable capacitance.

In another example embodiment, the second variable capacitance is in parallel with a third resistance ($R_2$) and in series with a fourth resistance ($R_1$); the fourth resistance ($R_1$) is coupled to the input; and the third resistance ($R_2$) and the second variable capacitance are coupled to the output.

In another example embodiment, a ratio of the first resistance ($R_4$) to the second resistance ($R_3$) is equal to a ratio of the third resistance ($R_2$) to the fourth resistance ($R_1$).

In another example embodiment, a zero of the set of mid-band frequencies is equal to $1/(R_2 * C_2)$.

In another example embodiment, the variable impedance includes a first variable resistance ($R_4$) in parallel with the active equalizer circuit; and the first variable resistance adjusts the set of mid-band frequencies of the output frequency band.

In another example embodiment, the variable impedance includes a second variable resistance ($R_2$) in series with the active equalizer circuit; and the second variable resistance adjusts a zero frequency of the output frequency band.

In another example embodiment, further comprising the active equalizer coupled to the passive equalizer.

In another example embodiment, the active equalizer is a continuous-time linear equalizer (CTLE).

In another example embodiment, the active equalizer is a linear equalizer.

In another example embodiment, the active equalizer is a decision-feedback equalizer (DFE).

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Equalizers are employed at a receiver (RX) front end to compensate for channel loss and provide equalized low-jitter output signals. Linear equalizers ensure precursor as well as postcursor equalization. Continuous-time linear equalizers (CTLEs) are one class of linear equalizers. Nonlinear equalization techniques, like decision-feedback equalization (DFE), only realize postcursor equalization.

The goal of an equalizer is to realize a transfer function which can be tuned such that it is the inverse of the channel transfer function. If properly tuned, the equalizer improves the receiver performance parameters, such as BER and jitter tolerance. A conventional capacitive source-degenerated first order equalizer, with one zero and two poles, provides limited capability to control the shape of equalizer transfer function.

Equalizers are often coupled to other circuits and channels with long cables or PCB traces, resulting in non-linear insertion loss (e.g. frequency specific insertion losses). Since one role of an equalizer is compensation for such insertion losses, equalizers with higher loss compensation/higher order pole/zero enables compensation for higher losses.

Figure 1A:
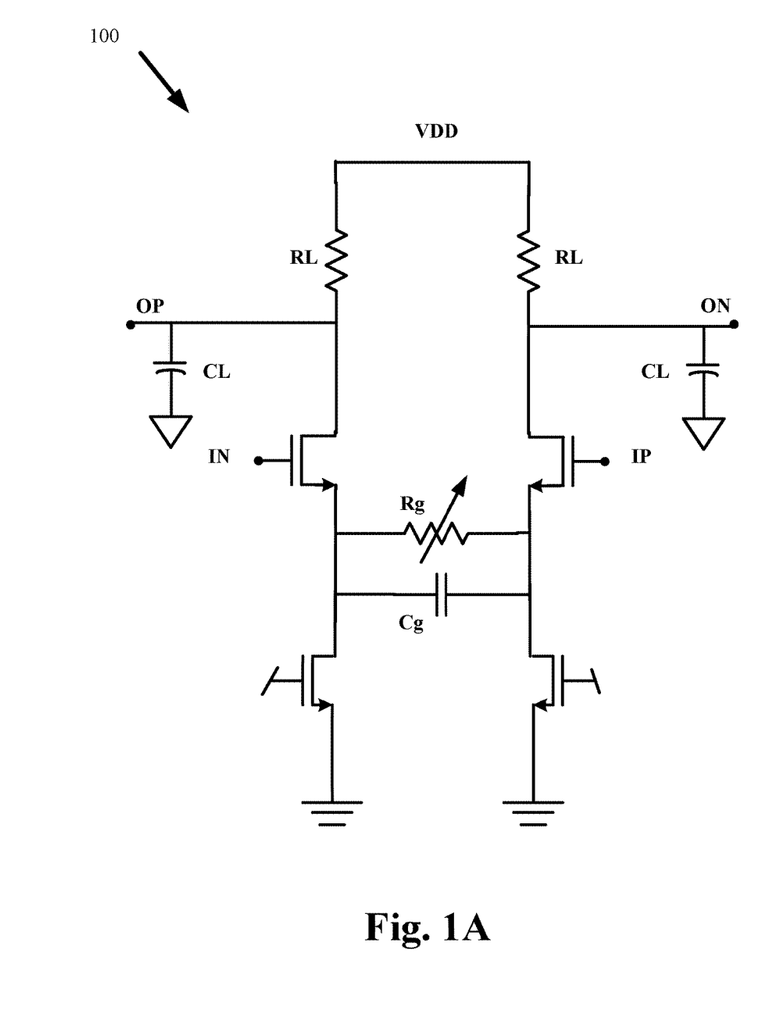
FIG. 1A represents an example first active equalizer.
Figure 1B:
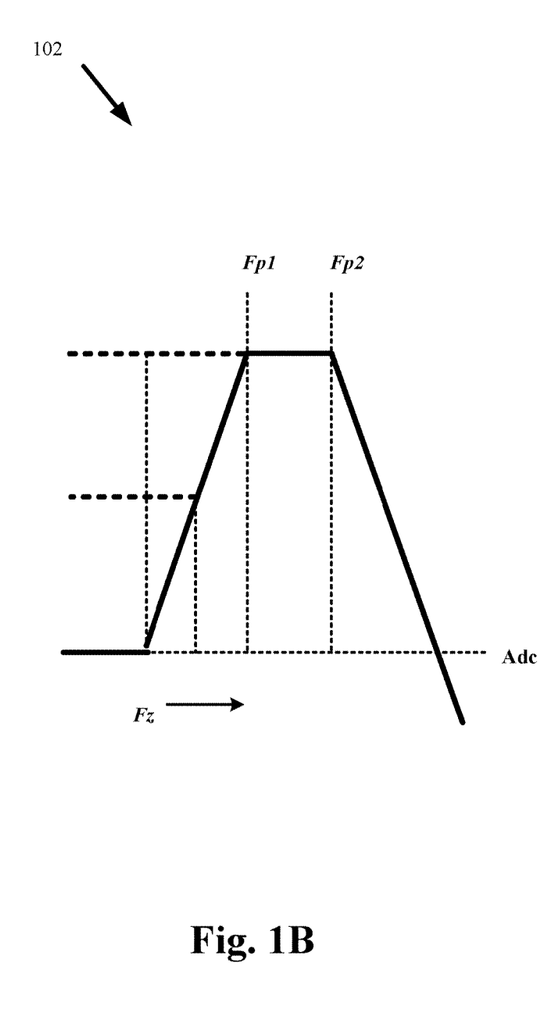
FIG. 1B represents an example DC gain and transfer function for the example first active equalizer.

FIG. 1A represents an example first active equalizer 100. FIG. 1B represents an example DC gain and transfer function 102 for the example first active equalizer 100. The DC gain and transfer function 102 can be written as:

$$A_{dc} = R_L/(R_g + 1/g_m) \quad (1)$$

$$H(s) \approx A_{ac}(1 + s\ R_g C_g)/((1 + 2\ s\ C_g/g_m)(1 + s\ RL\ CL)) \quad (2)$$

where $g_m/2$ is transconductance of differential pair transistors. As it is seen from equation 1, $R_g$ adjustment will change DC gain and zero location. It is difficult to get a high peaking gain and equal gain steps from the conventional architecture.

The maximum gain will be:

$$A_{pk} = g_m * R_L \quad (3)$$

Although a CMOS based circuit is shown, a BJT based circuit follows the same rules.

For conventional equalizer, the tuning of this type of equalizer is to change different source degeneration resistor for CMOS circuit or emitter degeneration resistor for BJT circuit. In this way, the DC attenuation will be changed while the peaking gain is fixed (Maximum peaking gain=$g_m \cdot R_L$), so that we can get different peaking of this equalizer.

A problem of conventional structure is when we only change the degeneration resistor, the peaking frequency will change because the zero created by degeneration RC pair ($\omega_{zero}=1/R_g C_g$) while the capacitor is fixed. To keep the peak frequency fixed, $R_g$ and $C_g$ need to be tuned/adjusted to get different peaking gain and maintain the same peaking frequency.

But for high speed applications, this tuning method can cause problems. Due to parasitic components, using discrete tuning steps, means there should be different resistor and capacitor settings for each step. In a fabricated circuit, the switches of all these steps will further introduce parasitic resistances and capacitances. These parasitic resistances and capacitances can't be well controlled and will cause unexpected peaking at low frequency or reduce the expected tuning range because the parasitic resistor and capacitor need to be calculated into the total amount of caps and resistors we can have for the tuning part, so the actual tuning range will be reduced by these parasitic effects.

If varactors are used in the tuning capacitor, the varactors will introduce less parasitic to circuit, but the problem is the tuning is not predictable because the exact value of the varactor is unknown. Adding another tuning/trimming for varactor is expensive and adds more parasitic components.

VT (voltage and temperature) variations can still affect the equalizer's gains after tuning/trimming, due to gain variations at zero and pole frequencies. Due to these many parasitic and PVT variation of components (L, R, C, $g_m$), the middle frequency is particularly challenging.

Programmable high-frequency peaking gain equalizers are able to compensate for frequency dependent insertion loss but are more complicated and require advanced techniques. For example, due to the nature of insertion loss variations and wide-band equalizer input signals, some programmability of DC gain and/or peaking gain is needed to provide the best equalization. Programming will need switchable components which have parasitic components which can't be handled easily by non-programmable circuits, so more advanced techniques are needed to make a programmable high frequency equalizer.

Programmable high-frequency peaking gain equalizers with a more predictable equalization, require more precise peaking gain control. Circuit trimming/tuning schemes can help reduce some peaking gain variations, but trimming is usually applied only at DC and Nyquist frequency peaking gains.

Even trimming at the peaking gain is itself a challenge since trimming while can be done at certain frequencies, there are gain variation at other frequencies can be more than the gain variations at the trimmed frequencies.

Active component equalizers thus may not have a desired peaking gain control for many high-frequency applications. Cascading two active equalizers would result in even greater variations of peaking gain over PVT. Cascading an active equalizer with a passive equalizer is another possibility.

Figure 2A:
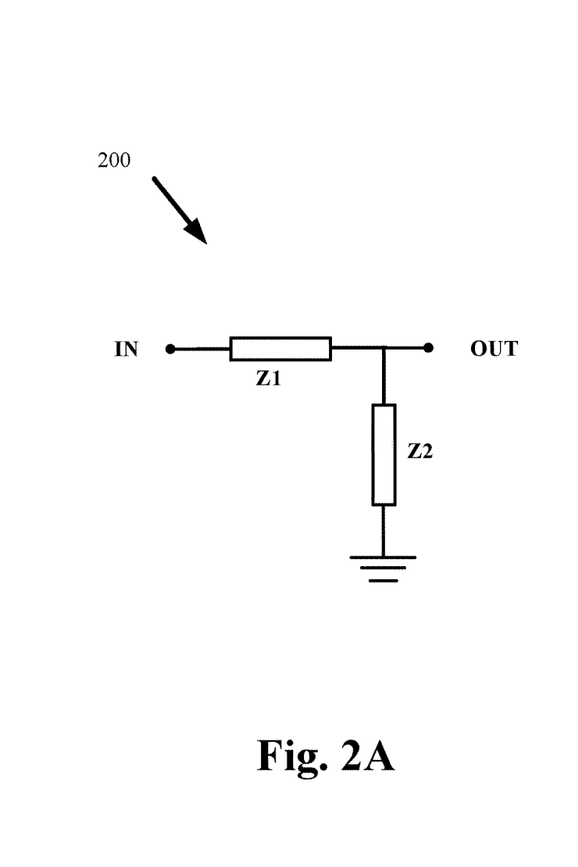
FIG. 2A represents an example first passive equalizer.
Figure 2B:
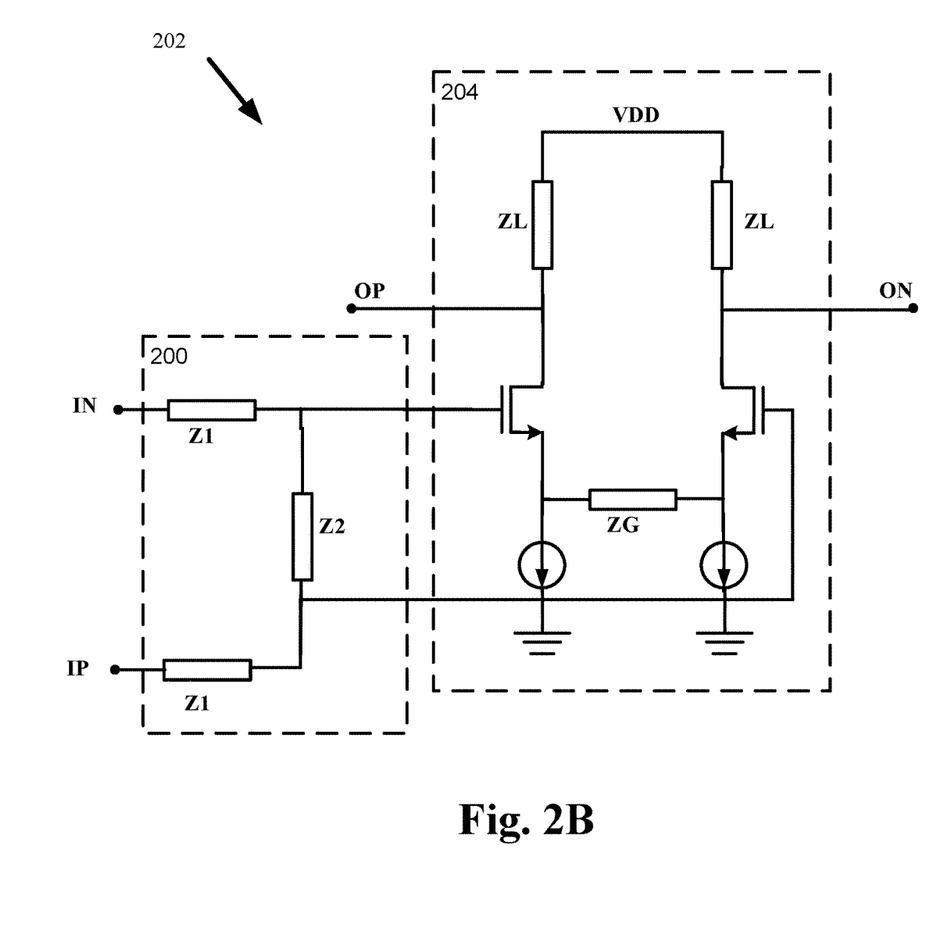
FIG. 2B represents an example combination of the first passive equalizer and an example second active equalizer.

FIG. 2A represents an example first passive equalizer 200. This passive equalizer's 200 transfer function can be written as: OUT/IN=$Z_2/(Z_1+Z_2)$ FIG. 2B represents an example combination 202 of the first passive equalizer 200 and an example second active equalizer 204 that is a generalized version of the first active equalizer 100. This combination 202 enables a sharper positive/negative gain slope. While the added passive equalizer 200 will bring some low frequency loss, extra poles and zeros will be added to it frequency response (e.g. AC response) transfer function. Such combination 202 however still includes gain variations, particularly in mid-band frequencies.

Figure 3A:
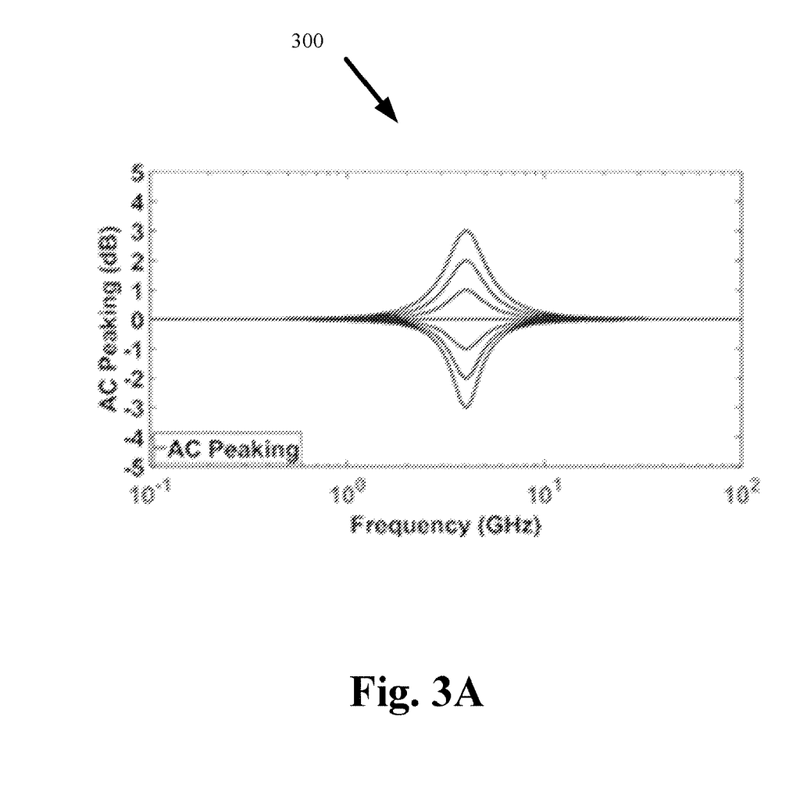
FIGS. 3A and 3B represent example mid-band frequency gain variation for the example combination.
Figure 3B:
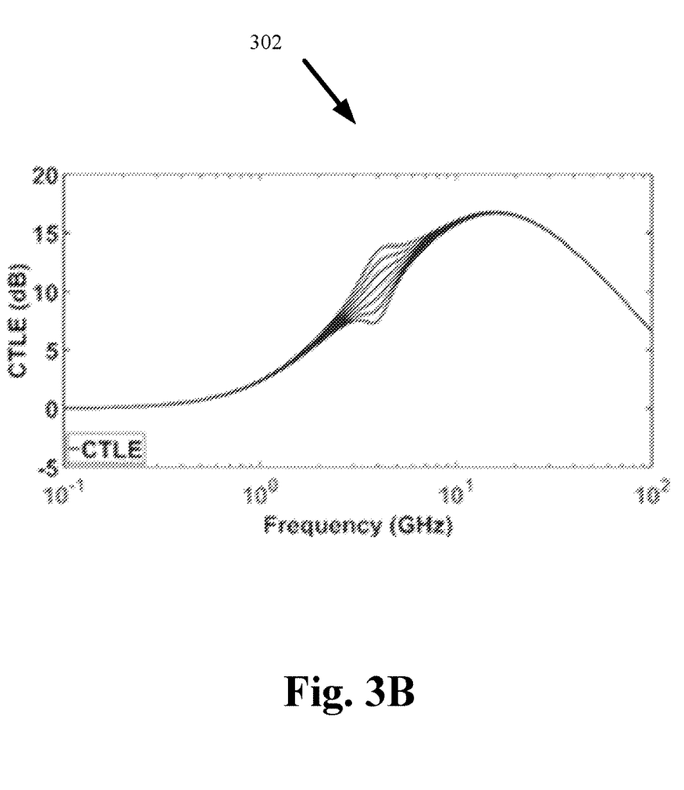

FIGS. 3A and 3B represent example mid-band frequency variation 300, 302 for a simulation of the example combination for 200 and 202. In these example, the pole/zero results in a +/−1, 2, 3 dB gain/loss at a 4 GHz mid-band frequency.

Thus a proper gain or loss at mid-band frequencies can have a considerable effect on eye-height and eye-width. Thus the mid-band frequency gain needs to be predictable and stable to enable the combination equalizer 202 to be used reliably in a lossy system. Final effect varies for different set ups and system, but the achieved information is valid as general impact of mid-band signal spectrum on output eye-diagram.

Now discussed are example embodiments of a passive equalizer circuit that provides a simpler, more predictable, and tunable equalization curve when cascaded with an active equalizer, particularly at zero and mid-band frequencies. The passive equalizer circuit components have lower gain variations over PVT (process, voltage, temperature). The zero and mid-band frequencies of the equalization curve can be tuned either statically (using trimming elements) or dynamically (using a controller).

The passive equalizer circuit can be applied in any circuit where equalization is needed such as a signal conditioner/redriver for USB3, USB4, DP, PCIe4, PCIe5, PCIe6 or any other wired high speed communication standards.

Figure 4A:
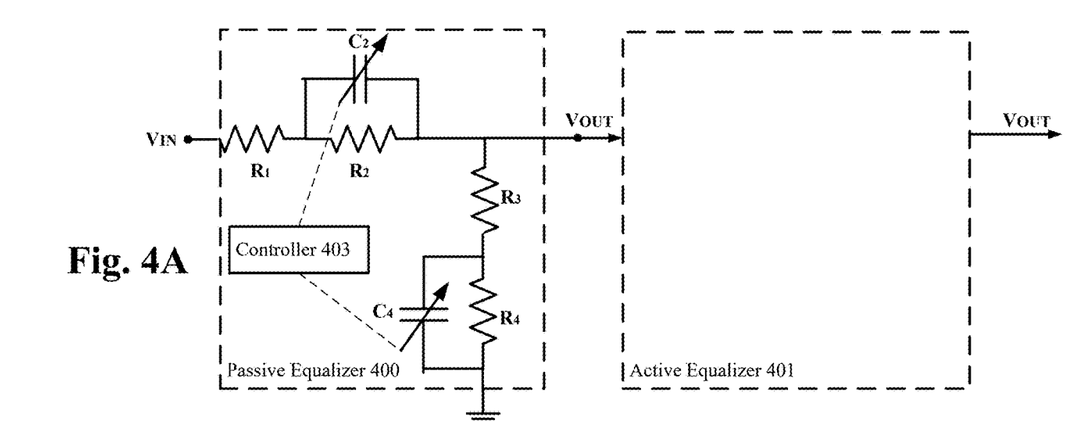
FIG. 4A represents an example second passive equalizer.

FIG. 4A represents an example second passive equalizer 400. The second passive equalizer 400 is shown in a single ended form and includes a signal input ($V_{IN}$), a signal output ($V_{OUT}$), a resistor $R_1$, a resistor $R_2$, a variable capacitance $C_2$, a resistor $R_3$, a resistor $R_4$, and a variable capacitance $C_4$.

Since capacitors are open at low frequencies, gain at low frequency can be calculated as: Gain(low frequency)=($R_3$+$R_4$)/($R_1$+$R_2$+$R_3$+$R_4$). Also since capacitors are shorted at high frequencies, gain at high frequency: can be calculated as: Gain(high-frequency)=$R_3$/($R_1$+$R_3$). A zero frequency is defined as $1/(R_2C_2)$. A mid-band pole frequency is defined as $1/(R_4C_4)$. For equal high-frequency and low-frequency gains $R_3/R_4=R_1/R_2$.

The passive equalizer circuit's 400 input VIN is configured to receive an input signal having an input frequency band. The passive equalizer circuit 400 operates as a transfer function circuit that transform the input frequency band into an output frequency band. The output VOUT in some example embodiments is configured to be coupled to an active equalizer circuit 401 (e.g. see FIGS. 1 and 2B) and carries an output signal having the output frequency band. The passive equalizer circuit 400 includes a first variable impedance (e.g. C4, but could also be R4, or a combination of both elements) configured to adjust a mid-band frequency gain of the output signal.

The passive equalizer circuit 400 also includes a second variable impedance (e.g. $C_2$, but could also be $R_2$, or a combination of both elements) configured to adjust a zero frequency gain of the output signal.

Peaking gain at low-frequencies and high-frequencies will be equal, but at mid-band frequencies the peaking gain will vary depending on the selected values for $C_2$ and $C_4$.

In this example embodiment, C2 and C4 include trimmable elements and/or are programmable using a controller 403. By varying C2 and C4, the zero and mid-band pole frequencies can be independently set as desired.

In other example embodiments, $R_2$ and $R_4$ include statically/one-time trimmable elements and/or are programmable using a controller and can also independently set the zero frequency and the mid-band pole frequency. In various example embodiments, $R_2$, $C_2$, $R_4$ and $C_4$ all include statically/one-time trimmable elements and/or are programmable using a controller.

Those skilled in the art will recognize that high frequency and low frequencies are relative and depend upon the applications that include the second passive equalizer 400.

Figure 4B:
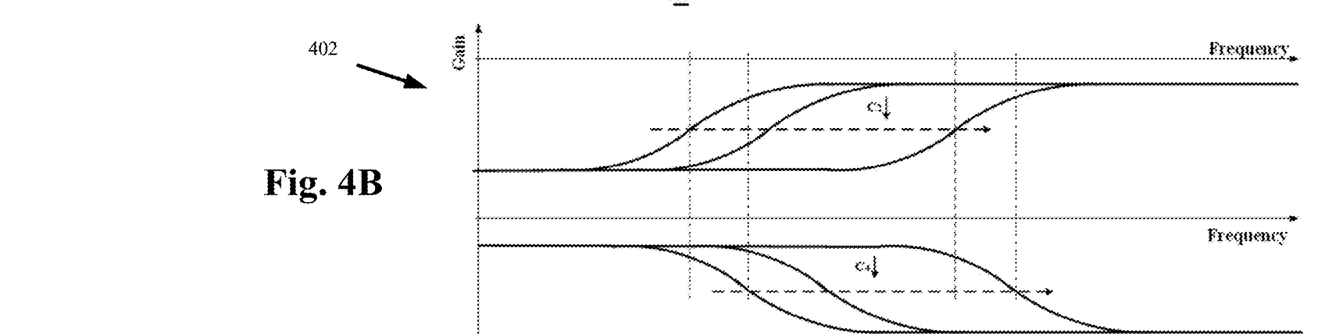
FIG. 4B represents an example first set of frequency AC response curves.

FIG. 4B represents an example set of zero frequency AC response curves 402. In this example embodiment, the zero frequency AC response curve 402 is shifted to the right (i.e. higher Fzero=$1/R_2C_2$) as $C_2$ is decreased while $C_4$=0.

Figure 4C:
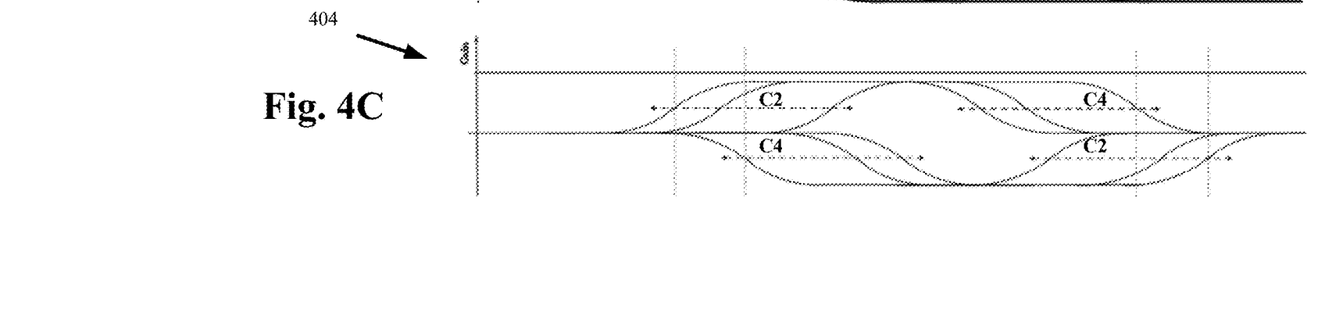
FIG. 4C represents an example second set of frequency AC response curves.

FIG. 4C represents an example set of mid-band pole frequency AC response curves 404. In this example embodiment, the pole frequency AC response curve 404 is shifted to the right (i.e. higher Fpole=$1/R_4C_4$) as $C_4$ is decreased while $C_2$=0.

Figure 4D:
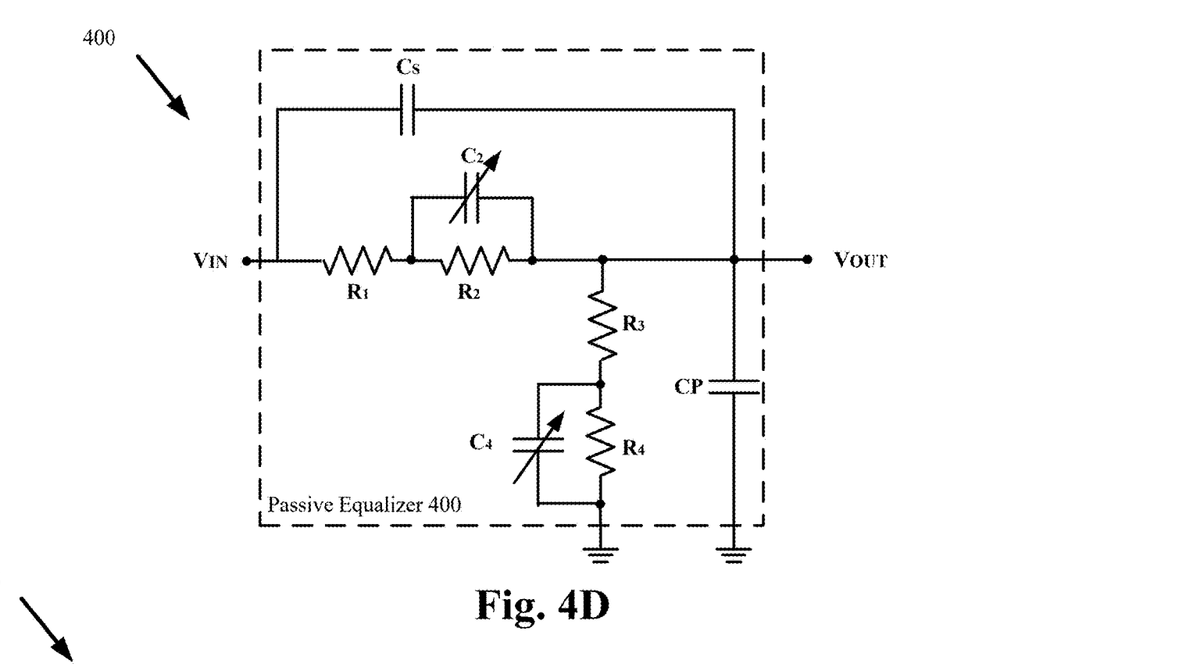
FIG. 4D represents the second passive equalizer with capacitors Cs and Cp shown.

FIG. 4D represents the second passive equalizer 400 with capacitors Cs and Cp shown. In various example embodiments, Cp can be a parasitic input capacitance of a next equalizer stage or other circuit. Cs is then added to compensate for Cp.

Figure 4E:
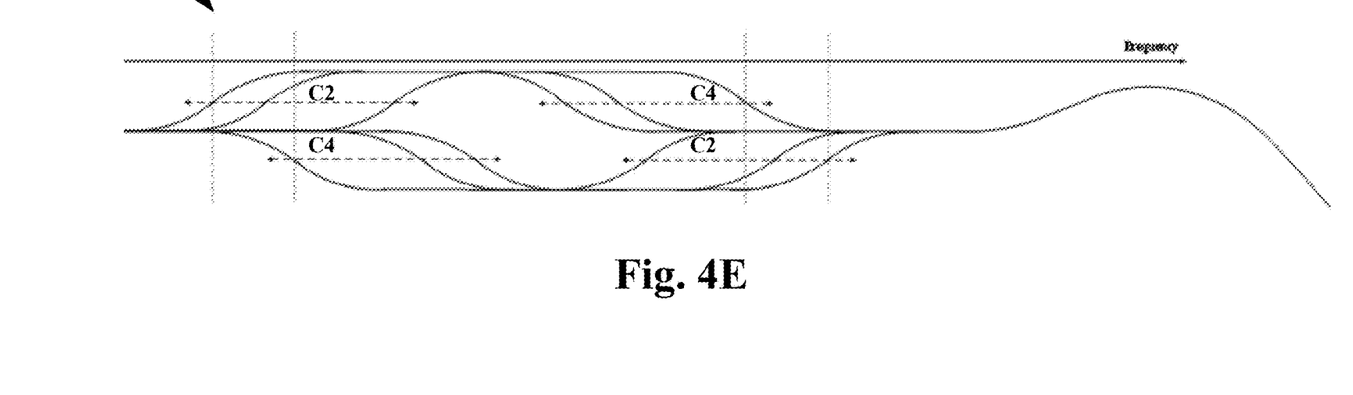
FIG. 4E represents an example third set of frequency AC response curves showing an effect of the capacitors Cs and Cp on the example second set of frequency response curves.

FIG. 4E represents an example set of combined zero and mid-band pole frequency AC response curves 406 showing an effect of Cs and the parasitic Cp on the example second set of frequency response curves 404.

Figure 5:
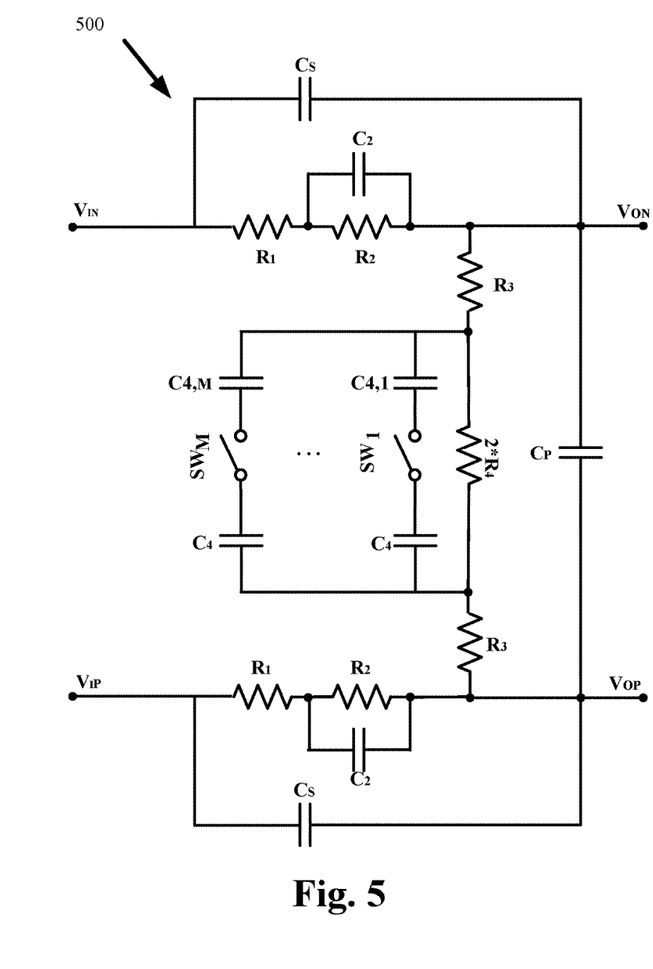
FIG. 5 represents an example of a third passive equalizer.

FIG. 5 represents an example of a third passive equalizer 500. The third passive equalizer 500 is shown in differential form and includes a differential signal input ($V_{IN}$, $V_{IP}$), a signal output ($V_{ON}$, $V_{OP}$), resistors $R_1$, resistors $R_2$, capacitances $C_2$, resistors $R_3$, a resistor 2*$R_4$, and a variable capacitance matrix.

The variable capacitance matrix includes "M" capacitive array elements. Each capacitive array element including first capacitance $C_4$, switch SWm, and a second capacitance $C_4$,m, where variable "m" ranges from "1" to "M".

The third passive equalizer 500 operates the same as the second passive equalizer circuit 400 except that zero frequency capacitances $C_2$ are fixed. Values of $C_{4,1}$ to $C_{4,M}$ will be selected for the needed mid-band frequency programmability.

Figure 6:
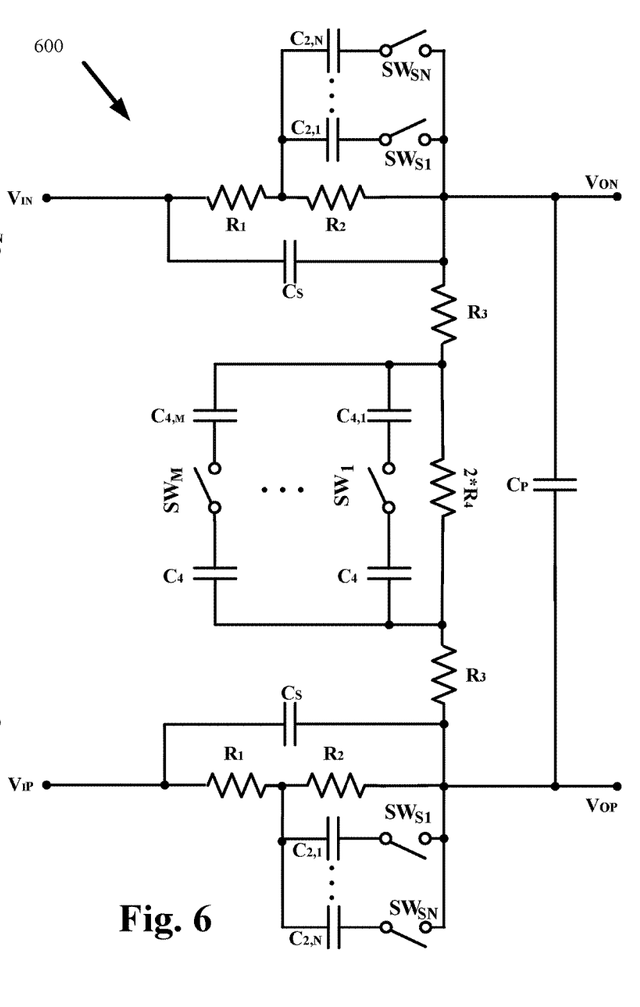
FIG. 6 represents an example of a fourth passive equalizer.

FIG. 6 represents an example of a fourth passive equalizer 600. The fourth passive equalizer 600 is also shown in differential form and includes a differential signal input ($V_{IN}$, $V_{IP}$), a signal output ($V_{ON}$, $V_{OP}$), resistors $R_1$, resistors $R_2$, a first variable capacitance matrix for varying $C_2$, resistors $R_3$, a resistor 2*$R_4$, and a second variable capacitance matrix for varying $C_4$.

The first variable capacitance matrix for varying $C_2$ includes "N" capacitive array elements. Each capacitive array element including a switch SWn, and a capacitance $C_4$,n, where variable "n" ranges from "1" to "N".

The second variable capacitance matrix for varying $C_4$ includes "M" capacitive array elements. Each capacitive array element including first capacitance $C_4$, switch SWm, and a second capacitance $C_4$,m, where variable "m" ranges from "1" to "M".

The fourth passive equalizer 600 operates the same as the second passive equalizer circuit 400. Values of $C_{2,1}$ to $C_{2,N}$ will be selected for the needed zero frequency programmability, and values of $C_{4,1}$ to $C_{4,M}$ will be selected for the needed mid-band frequency programmability.

Figure 7A:
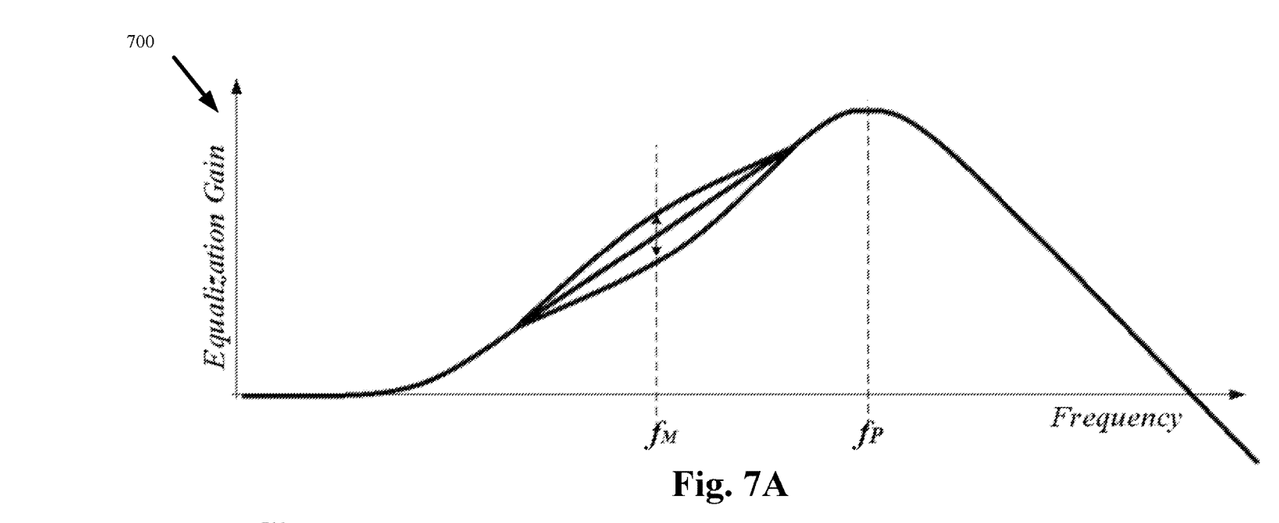
FIG. 7A represents an example set of mid-band frequency adjustments using either the second, third or fourth passive equalizers.

FIG. 7A represents an example set of mid-band frequency adjustments 700 using either the second, third or fourth passive equalizers 400, 500, 600. In various example embodiments, adjusting the mid-band frequency is more important for enabling a stable equalization.

Figure 7B:
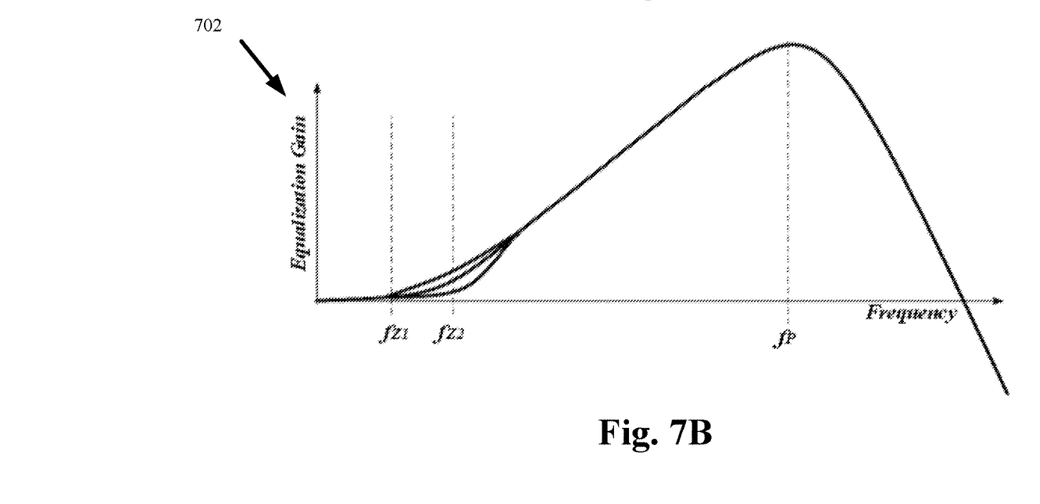
FIG. 7B represents an example set of zero frequency adjustments using either the second, third or fourth passive equalizers.

FIG. 7B represents an example set of zero frequency adjustments 702 using either the second, third or fourth passive equalizers 400, 500, 600. This Figures shows that an equalizer's zero frequency can be better controlled as well.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A passive equalizer circuit, comprising:
   an input configured to receive an input signal having an input frequency band;
   a transfer function circuit configured to transform the input frequency band into an output frequency band; and
   an output configured to be coupled to an active equalizer circuit and carry an output signal having the output frequency band;
   wherein the transfer function circuit includes a variable impedance circuit configured to adjust a mid-band frequency gain of the output signal;
   wherein the variable impedance circuit includes a first variable capacitor ($C_4$) having a variable capacitance in parallel with the active equalizer circuit;
   wherein the first variable capacitor adjusts a set of mid-band frequency gains of the output frequency band;
   wherein the first variable capacitor is in parallel with a first resistor ($R_4$) having a resistance and in series with a second resistor ($R_3$) having a resistance; and
   wherein the second resistor ($R_3$) is coupled to the output.
2. The passive equalizer circuit of claim 1:
   wherein the passive equalizer circuit includes only passive resistive, and/or capacitive elements.
3. The passive equalizer circuit of claim 1:
   wherein a value of the first variable capacitor is statically trimmed using a set of one-time-adjustable passive elements.
4. The passive equalizer circuit of claim 1:
   wherein a value of the first variable capacitor is dynamically trimmed using a controller.
5. The passive equalizer circuit of claim 1:
   wherein the first variable capacitor includes a set of switches each coupled in series with a separate capacitor; and
   wherein an open and closed state of the set of switches adjusts the first variable capacitor.
6. The passive equalizer circuit of claim 1:
   wherein a pole of the set of mid-band frequency gains is equal to $1/(R_4*C_4)$.
7. The passive equalizer circuit of claim 1:
   wherein the variable impedance circuit further includes a second variable capacitor ($C_2$) having a variable capacitance in series with the active equalizer circuit; and
   wherein the second variable capacitor adjusts a zero frequency of the output frequency band.
8. The passive equalizer circuit of claim 7:
   wherein the first variable capacitor includes a first set of switches each coupled in series with a separate capacitor;
   wherein an open and closed state of the first set of switches adjusts the first variable capacitor;
   wherein the second variable capacitor includes a second set of switches each coupled in series with a separate capacitor; and
   wherein an open and closed state of the second set of switches adjusts the second variable capacitor.
9. The passive equalizer circuit of claim 7:
   wherein the second variable capacitor is in parallel with a third resistor ($R_2$) having a resistance and in series with a fourth resistor ($R_1$) having a resistance;
   wherein the fourth resistor ($R_1$) is coupled to the input; and
   wherein the third resistor ($R_2$) and the second variable capacitor are coupled to the output.
10. The passive equalizer circuit of claim 9:
    wherein a ratio of the first ($R_4$) to the second resistance ($R_3$) is equal to a ratio of the third resistance ($R_2$) to the fourth resistance ($R_1$).
11. The passive equalizer circuit of claim 9:
    wherein a zero of the set of mid-band frequency gains is equal to $1/(R_2*C_2)$.
12. The passive equalizer circuit of claim 1:
    further comprising the active equalizer circuit coupled to the passive equalizer circuit.
13. The passive equalizer circuit of claim 1:
    wherein the active equalizer circuit is a continuous-time linear equalizer (CTLE).
14. The passive equalizer circuit of claim 1:
    wherein the active equalizer circuit is a linear equalizer.
15. The passive equalizer circuit of claim 1:
    wherein the active equalizer circuit is a decision-feedback equalizer (DFE).

* * * * *